(12) United States Patent
Saito et al.

(10) Patent No.: US 6,356,768 B1
(45) Date of Patent: Mar. 12, 2002

(54) PORTABLE TELEPHONE

(75) Inventors: Yoshio Saito, Fukushima-ken; Nobuyuki Suzuki, Miyagi-ken; Kiyoshi Watanabe, Fukushima-ken, all of (JP)

(73) Assignee: Alps Electric Co., Ltd, Tokyo (JP)

( * ) Notice: Subject to any disclaimer, the term of this patent is extended or adjusted under 35 U.S.C. 154(b) by 0 days.

(21) Appl. No.: 09/349,952

(22) Filed: Jul. 8, 1999

(30) Foreign Application Priority Data

Jul. 16, 1998 (JP) ............................................ 10-202144

(51) Int. Cl.$^7$ ............................ H04B 1/38; H04M 1/00; H04M 9/00; H05K 9/00; H05K 5/00
(52) U.S. Cl. ........................ 455/550; 455/90; 455/128; 455/347; 379/433; 361/816; 361/752; 361/753
(58) Field of Search .......................... 455/550, 90, 128, 455/347, 349, 351, 117; 379/433; 361/816, 752, 753

(56) References Cited

U.S. PATENT DOCUMENTS 5,731,964 A * 3/1998 Kitakubo et al. ........... 361/816

FOREIGN PATENT DOCUMENTS

JP 7-273685 10/1995

* cited by examiner

*Primary Examiner*—Tracy Legree
*Assistant Examiner*—Raymond Persino
(74) *Attorney, Agent, or Firm*—Brinks Hoffer Gilson & Lione

(57) ABSTRACT

Conventional portable telephones have a problem that their space factor is bad and the size thereof is increased because a transmitter/receiver unit and a battery are disposed in parallel with each other in a case formed of a lower cover and an upper cover. In a portable telephone of the present invention, the frame member of a transmitter/receiver unit is attached to a mother substrate in the state that the frame member is partly interposed between the mother substrate and a battery. With this arrangement, the space between the mother substrate and the battery can be effectively used, whereby there can be provided a small portable telephone having a good space factor.

8 Claims, 1 Drawing Sheet

PORTABLE TELEPHONE

BACKGROUND OF THE INVENTION

1. Field of the Invention

The present invention relates to a small trouble-free portable telephone.

2. Description of the Related Art

An example of conventional portable telephones will be described with reference to FIG. 2. The conventional portable telephone comprises a lower cover 21, which is molded of a synthetic resin, and an upper cover 22, which is molded of the synthetic resin and combined and coupled with the lower cover 21. The conventional portable telephone has an accommodation chamber 23 formed in the interior of the covers 21 and 22. The lower cover 21 has a plurality of pillars 21a in the interior of it, whereas the upper cover 22 includes a main body 22a and a lid member 22b which can be mounted on and dismounted from the main body 22a.

A mother substrate 24 composed of a printed circuit board includes conductive patterns, and various kinds of electric parts (not shown) are attached to the mother substrate 24 in the state that they are connected to the conductive patterns. Further, a connector 25 is attached to the upper surface of the mother substrate 24 which is accommodated in the accommodation chamber 23 and attached therein by the pillars 21a.

A transmitter/receiver unit 26 molded of a synthetic resin includes a rectangular frame member 27, various kinds of electric parts (not shown) disposed in the frame member 27, and a connector 28 disposed in the frame member 27 for connecting these electric parts to a connector 25 on the side of the mother substrate 24.

The transmitter/receiver unit 26 arranged as described above is attached to the mother substrate 24 in the accommodation chamber 23 in the state that the connector 28 is coupled with the connector 25 on the side of the mother substrate 24 simultaneously with the attachment of the transmitter/receiver unit 26 to the mother substrate 24.

A cartridge type battery 29 is formed to a rectangular shape and accommodated in the accommodation chamber 23 in parallel with the transmitter/receiver unit 26 in a lateral direction. The battery 29 is held in the accommodation chamber 23 by an appropriate means as well as can be replaced by removing the lid member 22b.

A switch member 30 has a plurality of push button sections 31 through which phone numbers and the like are input. The switch member 30 is disposed backward of the mother substrate 24 and located from a position where it confronts the battery 29 to a position where it confronts the connector 25. A desired phone number and the like can be input by depressing the push button sections 31.

The conventional portable telephones arranged as described above have a problem that the space factor of them is bad and their size is increased because the transmitter/receiver unit 26 and the battery 29 are attached in parallel with each other in the case formed of the covers 21 and 22.

Further, there is also a problem that when the push button sections 31 located in the vicinity of the connector 25 are depressed, the mother substrate 24 and the frame member 27 are moved in the direction of an arrow Y as well as the connectors 25 and 28 are bent by the movement, whereby not only the connection between the connectors 25 and 28 are made unstable but also they are broken.

SUMMARY OF THE INVENTION

As a first arrangement for solving the above problems, there is provided a portable telephone, which comprises a mother substrate attached in a case; a transmitter/receiver unit attached in the case and including a box-shaped frame member and various kinds of electric parts accommodated in the frame member; and a battery attached in the case, wherein the frame member of the transmitter/receiver unit is attached to the mother substrate in the state that the lower portion of it is placed on the mother substrate, the battery is placed on the upper portion the frame member which located opposite to the mother substrate and the frame member is partly interposed between the mother substrate and the battery.

As a second arrangement for solving the above problems, a first connector section is provided with the transmitter/receiver unit 6 as well as the mother substrate is provided with a second connector section which is coupled with the first connector section, and the first connector section is coupled with the second connector section in a portion of the interior of the frame member.

As a third arrangement for solving the above problems, the frame member comprises a low box-shaped section and a high box-shaped section, and the low box-shaped section is interposed between the mother substrate and the battery.

DESCRIPTION OF THE PREFERRED EMBODIMENT

Figure 1:
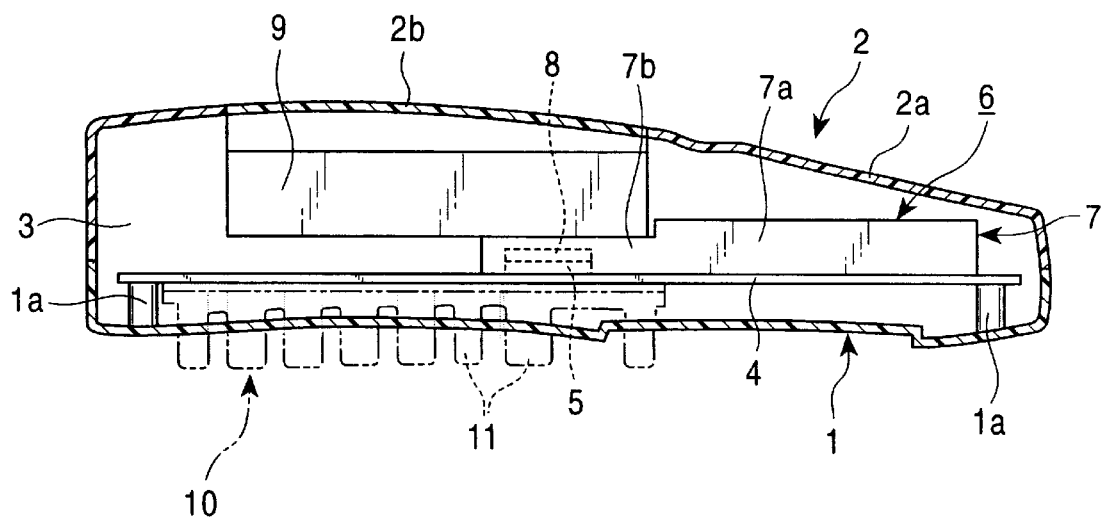
FIG. 1 is a sectional view of the main portion of a portable telephone of the present invention.
Figure 2:
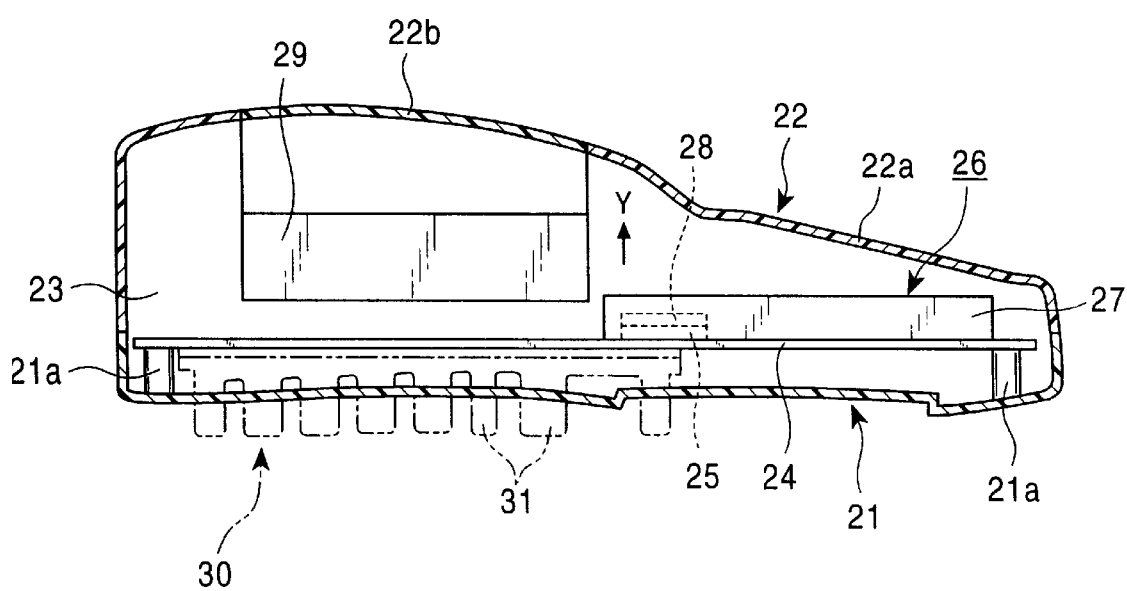
FIG. 2 is a sectional view of the main portion of a conventional portable telephone.

A portable telephone of the present invention will be described with reference to FIG. 1. FIG. 1 is a sectional view of the main portion of the portable telephone of the present invention. In FIG. 1, the portable telephone comprises a lower cover 1, which is molded of a synthetic resin, and an upper cover 2, which is molded of the synthetic resin and combined and coupled with the lower cover 1. The portable telephone has an accommodation chamber 3 formed in the interior of the covers 1 and 2. The lower cover 1 has a plurality of pillars 1a in the interior of it, whereas the upper cover 2 includes a main body 2a and a lid member 2b which can be mounted on and dismounted from the main body 2a.

A mother substrate 4 composed of a printed circuit board includes conductive patterns, and various kinds of electric parts (not shown) are attached to the mother substrate 4 in the state that they are connected to the conductive patterns. Further, a connector 5 is attached to the upper surface of the mother substrate 4 which is accommodated in the accommodation chamber 3 and attached therein by the pillars 1a.

A transmitter/receiver unit 6 molded of a synthetic resin includes a rectangular frame member 7 composed of a high box-shaped section 7a and a low box-shaped section 7b, various kinds of electric parts (not shown) disposed in the frame member 7, and a connector 8 disposed in the low box-shaped section 7b of the rectangular frame member 7 for connecting these electric parts to a connector 5 on the side of the mother substrate 4.

The transmitter/receiver unit 6 arranged as described above is attached to the upper surface of the mother substrate 4 in the accommodation chamber 3 in the state that the connector 8 is coupled with the connector 5 on the side of the mother substrate 4 simultaneously with the attachment of the transmitter/receiver unit 6 to the mother substrate 4.

A cartridge type battery 9 is formed to a rectangular shape and accommodated in the accommodation chamber 3 and attached thereto by an appropriate means in the state that it is partly placed on the low box-shaped section 7b of the frame member 7 of the transmitter/receiver unit 6.

The box-shaped section 7b is pressed by the battery 9 as well as interposed between the battery 9 and the mother substrate 4 so as to be held therebetween. Further, the battery 9 can be replaced by removing the lid member 2b.

A switch member 10 has a plurality of push button sections 11 through which phone numbers and the like are input. The switch member 10 is disposed backward of the mother substrate 24 and located from a position where it confronts the battery 9 to a position where it confronts the connector 5. A desired phone number and the like can be input by depressing the push button sections 11.

In the portable telephone of the present invention, the frame member 7 of the transmitter/receiver unit 6 is attached to the mother substrate 4 with a portion of the frame member 7 interposed between the mother substrate 4 and the battery 9. Accordingly, there can be provided a small portable telephone having a good space factor in which the space between the mother substrate 4 and the battery 9 can be effectively used.

The connector 8 is disposed in a portion of the interior of the frame member 7 which is held between the mother substrate 4 and the battery 9 and coupled with the connector 5 on the side of the mother substrate 4. Thus, when the push button sections 11 located in the vicinity of the connector 5 are depressed, the partial deformation of the mother substrate 4 and the frame member 7 can be prevented by the battery 9. Thus here is provided a long life portable telephone in which the connectors 5 and 8 are stably connected to each other without being bent or broken.

Further, the frame member 7 is composed of the high box-shaped section 7a and low box-shaped section 7b and the low box-shaped section 7b is interposed between the mother substrate 4 and the battery 9. Accordingly, the frame member 7 can be formed to a flat shape, whereby a thin portable telephone can be provided.

What is claimed is:

1. A portable telephone, comprising:

a case;

a mother substrate attached in the case and including a first connector section;

a transmitter/receiver unit attached in the case and including a box-shaped frame member, various kinds of electric parts accommodated in the frame member, and a second connector section coupled with the first connector section in an interior of the frame member, the frame member having a lower portion disposed on the mother substrate, a low box-shaped section having an upper portion, and a high box-shaped section having an upper portion; and a battery attached in the case and disposed on the frame member such that only the low box-shaped section is interposed between the mother substrate and the battery.

2. The portable telephone of claim 1, the battery having a rectangular shape.

3. The portable telephone of claim 1, the battery comprising a lower side that contacts only the upper portion of the low box-shaped section.

4. The portable telephone of claim 3, the battery having a rectangular shape.

5. The portable telephone of claim 1, the upper portion of the low box-shaped section disposed more distal to the mother substrate than the upper portion of the high box-shaped section.

6. The portable telephone of claim 5, the battery having a rectangular shape.

7. The portable telephone of claim 5, the battery comprising a lower side that contacts only the upper portion of the low box-shaped section.

8. The portable telephone of claim 7, the battery having a rectangular shape.

* * * * *